United States Patent [19]

Fisher

[11] Patent Number: 5,484,290
[45] Date of Patent: Jan. 16, 1996

[54] ANIMAL PACKING DUMMY

[76] Inventor: Simon Fisher, Circle 7 Ranch, Glenburn, Star Rte., Fall River Mills, Calif. 96028

[21] Appl. No.: 282,364

[22] Filed: Jul. 29, 1994

[51] Int. Cl.⁶ ........................................... G09B 19/00
[52] U.S. Cl. ........................................... 434/225; 434/219
[58] Field of Search ................................ 439/219, 225, 439/247, 260; 446/28

[56] References Cited

U.S. PATENT DOCUMENTS 2,846,810  8/1958  Ory ................................. 434/225
3,716,941  2/1973  Dowden et al. ................. 434/225
4,203,233  5/1980  Crane ............................... 434/247

*Primary Examiner*—Edgar S. Burr
*Assistant Examiner*—Lynn D. Hendrickson

[57] ABSTRACT

An animal packing dummy comprising a replica of a packing animal; a saddle coupled to the packing animal; a plurality of pack boxes coupleable to the saddle; a plurality of lash lines for securing the pack boxes to the replica using knots; and an instruction manual describing how to tie knots for securing the pack boxes to the replica.

7 Claims, 3 Drawing Sheets

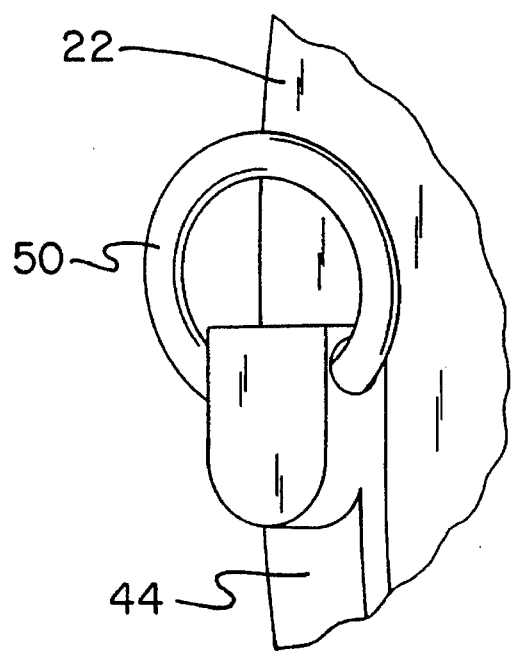
FIG. 3
FIG. 4
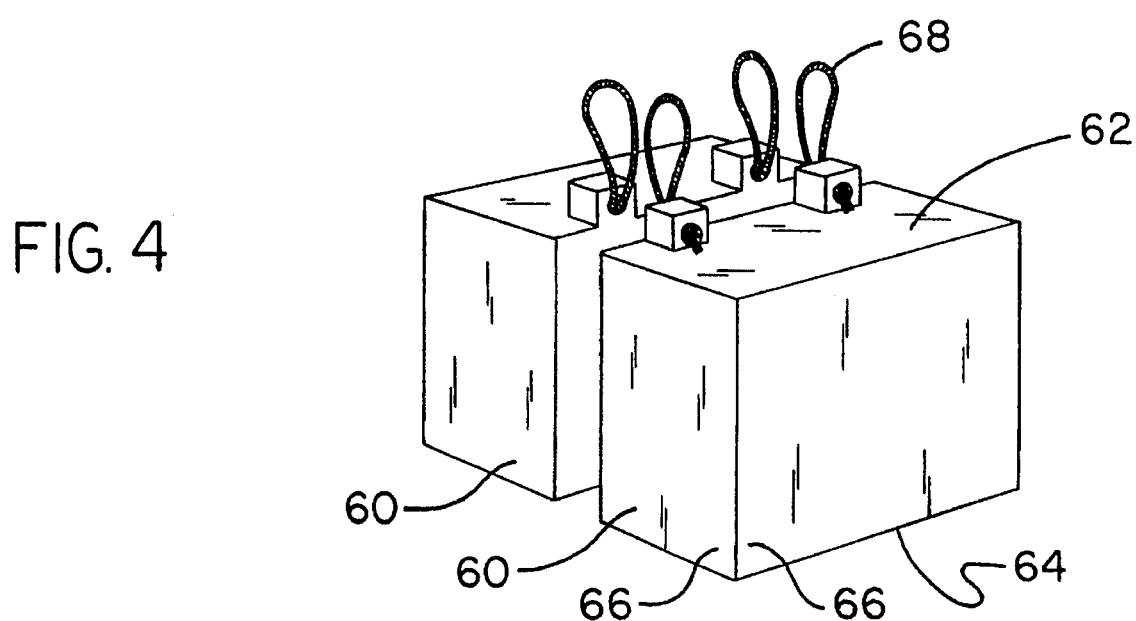

5,484,290

ANIMAL PACKING DUMMY

BACKGROUND OF THE INVENTION

1. Field of the Invention

The present invention relates to an animal packing dummy and more particularly pertains to providing a user a safe and accurate way of learning to tie knots involved with packing equipment on packing animals such as mules, horses, and the like with an animal packing dummy.

2. Description of the Prior Art

The use of packing dummies is known in the prior art. More specifically, packing dummies heretofore devised and utilized for the purpose of securing equipment for transport thereon are known to consist basically of familiar, expected and obvious structural configurations, notwithstanding the myriad of designs encompassed by the crowded prior art which have been developed for the fulfillment of countless objectives and requirements.

By way of example, U.S. Pat. Des. No. 318,498 to Olson discloses a toy horse. U.S. Pat. No. 3,930,331 to Simeone discloses a toy for knot tying. U.S. Pat. No. 4,203,233 to Crane discloses a calf-tying practice dummy. U.S. Pat. No. 5,192,210 to Thomas et al. discloses a training apparatus for cattle roping.

While these devices fulfill their respective, particular objective and requirements, the aforementioned patents do not describe an animal packing dummy that provides a user a safe and accurate way of learning to tie knots involved with packing equipment on packing animals.

In this respect, the animal packing dummy according to the present invention substantially departs from the conventional concepts and designs of the prior art, and in doing so provides an apparatus primarily developed for the purpose of providing a user a safe and accurate way of learning to tie knots involved with packing equipment on packing animals such as mules, horses, and the like.

Therefore, it can be appreciated that there exists a continuing need for new and improved animal packing dummy which can be used for providing a user a safe and accurate way of learning to tie knots involved with packing equipment on packing animals such as mules, horses, and the like. In this regard, the present invention substantially fulfills this need.

SUMMARY OF THE INVENTION

In the view of the foregoing disadvantages inherent in the known types of packing dummies now present in the prior art, the present invention provides an improved animal packing dummy. As such, the general purpose of the present invention, which will be described subsequently in greater detail, is to provide a new and improved animal packing dummy and method which has all the advantages of the prior art and none of the disadvantages.

To attain this, the present invention essentially comprises, in combination, a molded plastic replica of a packing animal having a front portion, a back portion, and a head portion extended upwards therefrom, a stomach portion located below the back portion, a pair of opposed cinch portions each extended between the back portion and the stomach portion, a hoof portion located below the stomach portion, and a rear portion extended from the stomach portion, cinch portion, and back portion at a location opposite the front portion. The replica includes a saddle with a base integrally coupled to the back portion and extended downwards therefrom to the cinch portions with the base including a front end and a rear end, a first pair of cross bars coupled to the front end of the base and extended upwards therefrom, a second pair of cross bars coupled to the rear end of the base and extended upwards therefrom, a front collar extended from the front of the base and integrally wrapped around the front portion in a closed loop configuration about the head portion, a rear collar extended from the rear of the base and integrally wrapped around the rear portion and back portion, and an elongated cinch belt integrally wrapped around the stomach portion such that its ends are extended upwards towards the cinch portion. The replica has a height of about 9 inches as measured vertically from the hoof portion to the back portion and a length of about 12 inches as measured horizontally from the front portion to the rear portion.

A pair of rigid metal cinch rings are included with each cinch ring coupled to a separate end of the cinch belt. A pair of pack boxes are included with each pack box formed of a rectangular block of plastic having a top face, a bottom face, and side faces extended therearound. Each pack box further includes a pair of spaced loops formed of nylon cord coupled to the top face of a block at a location near the juncture of the top face with a side face and with a pair spaced loops securable over a cross bar of the first pair and a cross bar of the second pair for allowing a pack box to hang downwards across a cinch portion. A generally rectangular tarp is included and formed of a cloth material for covering the pack boxes when secured to the cross bars. A pair of lash lines are included and formed of nylon cord with each lash line used for coupling the pack boxes to the base and cinch rings using knots, thereby securing the pack boxes to the replica. Lastly, an instruction manual is included and describes how to tie a diamond hitch knot, a double diamond knot, a box-hitch knot, and a sling hitch knot with the diamond hitch knot, double diamond knot, box-hitch knot, and sling hitch knot used for securing the pack boxes to the replica.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved animal packing dummy which has all the advantages of the prior art packing dummies and none of the disadvantages.

It is another object of the present invention to provide a new and improved animal packing dummy which may be easily and efficiently manufactured and marketed.

It is a further object of the present invention to provide a new and improved animal packing dummy which is of durable and reliable construction.

An even further object of the present invention is to provide a new and improved animal packing dummy which is susceptible of a low cost of manufacture with regard to both materials and labor, and which accordingly is then susceptible of low prices of sale to the consuming public, thereby making such an animal packing dummy economically available to the buying public.

Still yet another object of the present invention is to provide a new and improved animal packing dummy which provides in the apparatuses and methods of the prior art some of the advantages thereof, while simultaneously overcoming some of the disadvantages normally associated therewith.

Even still another object of the present invention is to provide a new and improved animal packing dummy for providing a user a safe and accurate way of learning to tie knots involved with packing equipment on packing animals such as mules, horses, and the like.

Lastly, it is an object of the present invention to provide a new and improved animal packing dummy comprising a replica of a packing animal; a saddle coupled to the packing animal; a plurality of pack boxes coupleable to the saddle; a plurality of lash lines for securing the pack boxes to the replica using knots; and an instruction manual describing how to tie knots for securing the pack boxes to the replica.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an enlarged view of a metal cinch ring secured to one side of the replica.

FIG. 4 is a perspective view of the pack boxes of the present invention.

The same reference numerals refer to the same parts through the various figures.

DESCRIPTION OF THE PREFERRED EMBODIMENT

Figure 1:
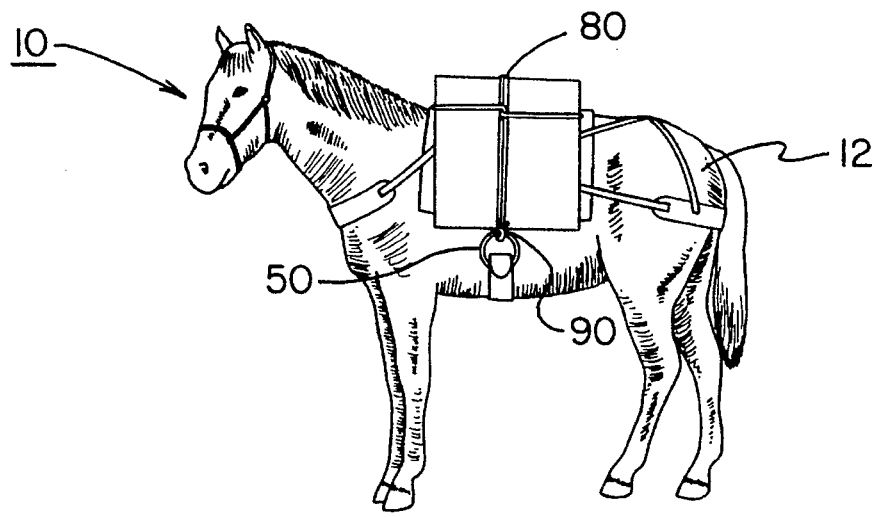
FIG. 1 is a side-elevational view of the preferred embodiment constructed in accordance with the principles of the present invention.
Figure 2:
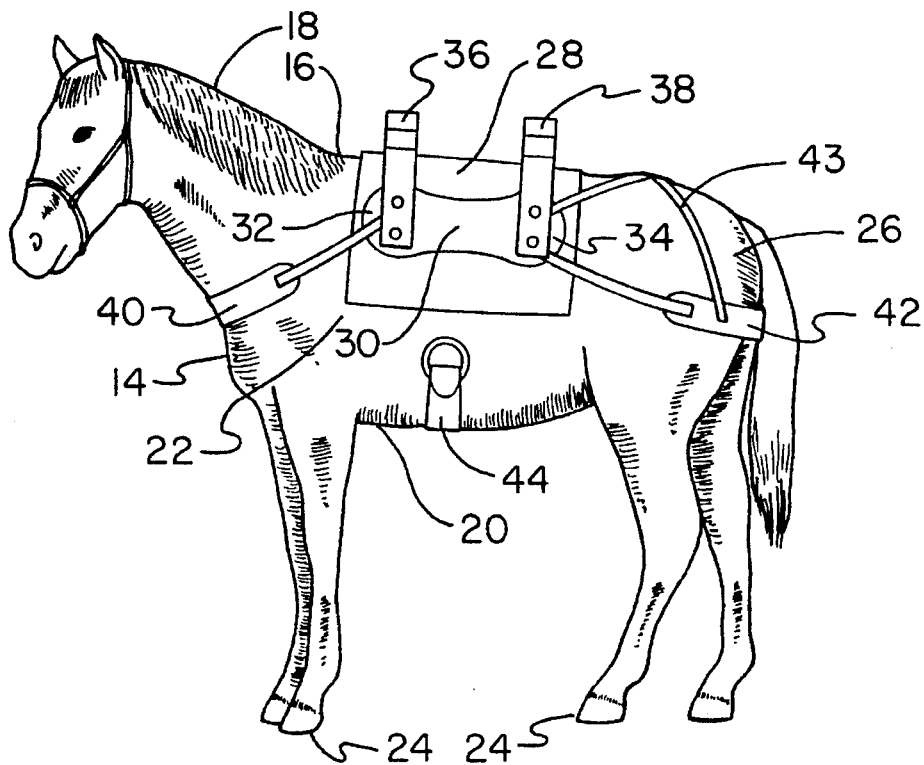
FIG. 2 is an enlarged side-elevational view of the present invention with the pack boxes and tarp removed.
Figure 5:
FIG. 5 is a perspective view of the lash lines of the present invention.
Figure 6:
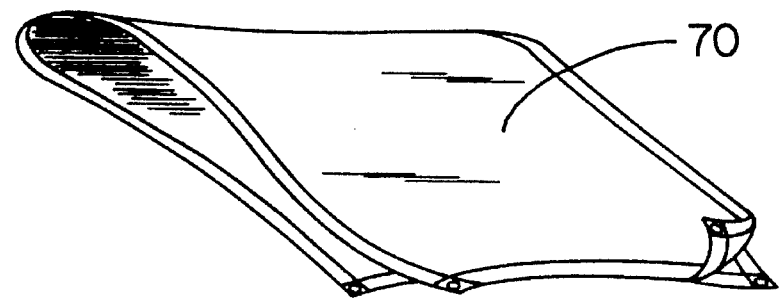
FIG. 6 is a perspective view of the tarp of the present invention.

With reference now to the drawings, and in particular, to FIG. 1 thereof, the preferred embodiment of the new and improved animal packing dummy embodying the principles and concepts of the present invention and generally designated by the reference number 10 will be described.

Specifically, the present invention includes six major components. The major components are the replica, cinch rings, pack boxes, tarp, lash lines, and instruction manual. These components are interrelated to provide the intended function.

More specifically, it will be noted in the various figures that the first major component is the replica. The replica is formed in the shape of a packing animal 12. This packing animal can be a mule, horse, or the like. The replica is formed of a molded plastic. The replica has a front portion 14, a back portion 16, and a head portion 18 extended upwards therefrom. The replica also has a stomach portion 20 located below the back portion. A pair of opposed cinch portions 22 are each extended between the back portion and the stomach portion on each side of the replica. The replica also has a hoof portion 24 located below the stomach portion. A rear portion 26 is extended from the stomach portion, cinch portion, and back portion at a location opposite the front portion.

The replica further includes a saddle 28. The saddle is formed of molded plastic and integrally coupled to the replica. The saddle is shaped in the form of those conventionally utilized for actual packing yet dimensionally sized with respect to the replica. The saddle has a base 30 coupled to the back portion and extended downwards therefrom over part of the cinch portions of the replica. The base has a front end 32 and a rear end 34. A first pair 36 of cross bars are coupled to the front end of the base and extended upwards therefrom. A second pair 38 of cross bars are coupled to the rear end of the base and extended upwards therefrom. The cross bars are adapted for holding pack boxes thereon. The saddle also includes a front collar 40. The front collar is extended from the front of the base and integrally wrapped around the front portion in a closed loop configuration about the head portion of the replica. The saddle also includes a rear collar 42 extended from the rear of the base and integrally wrapped around the rear and back portion of the replica. The collar includes a pair of cross straps 43 coupled from the rear of the base to the rear part of the collar. A saddle also includes an elongated cinch belt 44. The cinch belt is integrally wrapped around the stomach portion such that its ends are extended upwards towards the cinch portion below the saddle. The replica has a height of about 9 inches as measured vertically from the hoof portion to the back portion and a length of about 12 inches as measured horizontally from the front portion to the rear portion.

The second major component is the cinch rings 50. The present invention includes a pair of cinch rings. They are generally annular in structure. The cinch rings are formed of a rigid metal. They are dimensionally sized with respect to the replica. Each cinch ring is coupled to a separate end of the cinch belt. Each cinch ring is used as a securement point for coupling pack boxes to the replica.

The third major component is the pack boxes 60. The present invention includes a pair of pack boxes. The pack boxes are similar in form to conventional pack boxes used for actual packing yet dimensionally sized with respect to the replica. Each pack box is formed of a rectangular block of rigid plastic. Each block has a top face 62, a bottom face 64, and side faces 66 extended therearound. Each pack box further has a pair of spaced loops 68 formed of nylon cord. Each pair loops is coupled to the top face of each pack box at a location near the juncture of its top face with an adjacent side face. Each pair of spaced loops is securable over a cross bar of the first pair 36 and a cross bar of the second pair 38 on the same side of the replica such that the corresponding pack box hangs downwards across a cinch portion 22 thereof. When both pack boxes secured to the replica, one pack box hangs downwards near one cinch portion and the other pack box hangs downwards near the opposite cinch portion.

The fourth major component is the tarp 70. The tarp is generally rectangular in structure. The tarp is similar in form to conventional tarps used for actual packing yet dimensionally sized with respect to the replica. The tarp is formed of a cloth material. The tarp is used for covering the pack boxes 60 when the pack boxes are secured to the cross bars of the replica.

The fifth major component is the lash lines. The present invention includes a pair of lash lines. The lash lines are similar in form to those used for packing yet dimensionally sized with respect to the replica. The lash lines are formed of a nylon cord. Each lash line is used for coupling the pack boxes to the base 30 of the saddle and cinch rings 50 using knots 90. The lash lines thereby secure the pack boxes to the replica.

The sixth major component is the instruction manual 100. The instruction manual describes how to tie knots used for securing pack boxes to the replica. These knots are of the same type used for securing actual pack boxes to a packing animal. Specifically, the instruction manual describes how to tie a diamond hitch knot, a double diamond knot, a box-hitch knot, and a sling hitch knot. Therefore, by using the replica, cinch rings, pack boxes, tarp, lash lines, and instruction manual, a user can learn how to secure pack boxes to a packing animal without the need of having actual equipment or live packing animals available. Furthermore, user can learn how to secure pack boxes to a packing animal safely using the present invention since the possibility of being injured by a live packing animal or actual heavy packing boxes is eliminated. Another benefit of the present invention is that it size permits it to be transported easily from one location to another, thereby making it an effective portable teaching tool.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. Apparatus for providing a user a safe and accurate way of learning to tie knots involved with packing equipment on packing animals comprising, in combination:

a molded plastic replica of a packing animal having a front portion, a back portion, and a head portion extended upwards therefrom, a stomach portion located below the back portion, a pair of opposed cinch portions each extended between the back portion and the stomach portion, a hoof portion located below the stomach portion, and a rear portion extended from the stomach portion, cinch portion, and back portion at a location opposite the front portion, the replica further having a saddle with a base integrally coupled to the back portion and extended downwards therefrom to the cinch portions and with the base including a front end and a rear end, a first pair of cross bars coupled to the front end of the base and extended upwards therefrom, a second pair of cross bars coupled to the rear end of the base and extended upwards therefrom, a front collar extended from the front of the base and integrally wrapped around the front portion in a closed loop configuration about the head portion, a rear collar extended from the rear of the base and integrally wrapped around the rear portion and back portion, and an elongated cinch belt integrally wrapped around the stomach portion such that its ends are extended upwards towards the cinch portion, the replica having a height of about 9 inches as measured vertically from the hoof portion to the back portion and a length of about 12 inches as measured horizontally from the front portion to the rear portion;

a pair of rigid metal cinch rings, each cinch ring coupled to a separate end of the cinch belt;

a pair of pack boxes, each pack box formed of a rectangular block of plastic having a top face, a bottom face, and side faces extended therearound, each box further having a pair of spaced loops formed of nylon cord coupled to the top face of a block at a location near the juncture of the top face with a side face and with a pair spaced loops securable over a cross bar of the first pair and a cross bar of the second pair for allowing a pack box to hang downwards across a cinch portion;

a generally rectangular tarp formed of a cloth material for covering the pack boxes when secured to the cross bars;

a pair of lash lines formed of nylon cord, each lash line used for coupling the pack boxes to the base and cinch rings using knots, thereby securing the pack boxes to the replica; and an instruction manual describing how to tie a diamond hitch knot, a double diamond knot, a box-hitch knot, and a sling hitch knot with the diamond hitch knot, double diamond knot, box-hitch knot, and sling hitch knot used for securing the pack boxes to the replica.

2. Apparatus for providing a user a safe and accurate way of learning to tie knots involved with packing equipment on packing animals comprising, in combination:

a replica of a packing animal;

a saddle coupled to the replica of a packing animal;

a plurality of pack boxes coupleable to the saddle;

a plurality of lash lines for securing the pack boxes to the replica using knots; and an instruction manual describing how to tie knots for securing the pack boxes to the replica.

3. The animal packing dummy as set forth in claim 2 wherein the replica of a packing animal is a mule.

4. The animal packing dummy as set forth in claim 2 wherein the replica of a packing animal is a horse.

5. The animal packing dummy as set forth in claim 2 wherein the replica is formed of molded plastic, the saddle is formed of plastic and integrally coupled to the replica, and the pack boxes are formed of plastic.

6. The animal packing dummy as set forth in claim 2 wherein the replica has a height and a length with height of the replica being about 9 inches and the length of the replica being about 12 inches.

7. The animal packing dummy as set forth in claim 2 further including a tarp for covering the pack boxes when secured to the saddle.

* * * * *